United States Patent [19]

Kaden

[11] Patent Number: 5,361,550
[45] Date of Patent: Nov. 8, 1994

[54] MOVABLE HARDENED AIR FORM DOME-SHAPED STRUCTURE FOR CONTAINING HAZARDOUS, TOXIC, OR RADIOACTIVE AIRBORNE RELEASES

[75] Inventor: Richard A. Kaden, Walla Walla, Wash.

[73] Assignee: The United States of America as represented by the Secretary of the Army, Washington, D.C.

[21] Appl. No.: 162,924

[22] Filed: Dec. 8, 1993

[51] Int. Cl.$^5$ .......................... E04B 1/32; B09B 1/00
[52] U.S. Cl. .................... 52/2.15; 52/2.25; 52/80.1; 135/93; 405/128
[58] Field of Search .............. 52/2.15, 2.25, 80.1, 52/81.6, 122.1, 127.1, 127.2, 127.3, 247, 294; 135/93; 405/128; 588/249

[56] References Cited

U.S. PATENT DOCUMENTS

| | | | |
|---|---|---|---|
| 3,766,844 | 10/1973 | Donnelly et al. | 135/93 |
| 3,999,333 | 12/1976 | Amarantos | 52/2.25 |
| 4,021,972 | 5/1977 | Choate | 52/2.15 |
| 4,128,204 | 12/1978 | Wade | 52/2.25 |
| 4,155,967 | 5/1979 | South et al. | |
| 4,557,090 | 12/1985 | Keller, Sr. | 52/80.1 |
| 4,618,284 | 10/1986 | Marks | |
| 4,642,856 | 2/1977 | Harrington | 52/2.15 |
| 4,693,111 | 2/1987 | Jones | 405/128 |
| 4,875,805 | 10/1989 | Gross | 405/128 |
| 4,973,195 | 11/1990 | Sweeney et al. | 405/128 |
| 5,094,044 | 3/1992 | Dykmanns | 552/80 |
| 5,203,644 | 4/1993 | Menkhaus et al. | 405/128 |

FOREIGN PATENT DOCUMENTS

| | | | |
|---|---|---|---|
| 1281136 | 10/1968 | Germany | 52/2.25 |
| 1293303 | 2/1987 | Russian Federation | 52/2.15 |

Primary Examiner—Carl D. Friedman
Assistant Examiner—Wynn E. Wood
Attorney, Agent, or Firm—Luther A. Marsh

[57] ABSTRACT

The present invention provides a means for secondary containment of airborne releases from underground storage tanks, trenches, cribs, and vaults. Airborne releases of nuclear waste from previously operated nuclear weapons plants is a particular problem which this invention addresses. The dome structure is fabricated by large inflatable fabric forms that are insulated and hardened by specialized shotcrete processes for either spherical or elliptical type dome structure. This dome structure is designed to be reused and thus made mobile by having at least three large capacity crawler/transporters or a crane link-up and lift the dome structure for transport to a desired HTRW location. The dome structure is made of layered materials comprising a thin flexible membrane of urethane foam and conventional shotcrete placed on steel reinforcing bars. Another novel feature is a post-tensioned reinforced concrete ring beam serves as a foundation footing that includes steel-insert lifting points for load transfer to the crawler/transporters or crane. In addition to the basic dome structure, utilities are included comprising an airlock unit for segregated access into the dome structure interior and portable trailer utilities for heating, ventilating, air conditioning and decontamination.

8 Claims, 8 Drawing Sheets

MOVABLE HARDENED AIR FORM DOME-SHAPED STRUCTURE FOR CONTAINING HAZARDOUS, TOXIC, OR RADIOACTIVE AIRBORNE RELEASES

STATEMENT OF GOVERNMENT INTEREST

The invention described herein may be manufactured and used by or for the Government of the United States of America for governmental purposes without the payment of any royalties thereon.

FIELD OF THE INVENTION

This invention is a reusable land reclamation apparatus and method which provides a safe and secure working environment for workers of hazardous, toxic, or radioactive waste (HTRW). In particular, the land reclamation activities of HTRW sampling, retrieval and containment for land restoration. The invention herein provides for continuous operations at HTRW work sites regardless of weather conditions. Moreover, the apparatus can act as a secondary containment structure that makes the surrounding external environment safe from both accidental and unscheduled airborne releases of HTRW. The apparatus includes a reusable movable hardened dome-shaped structure with a specially designed foundation ring beam that is transported by a load-lifting mechanical device such as a crane or crawler transporter.

BACKGROUND OF THE INVENTION

Presently, there are no existing solutions to prevent unscheduled airborne releases of hazardous or radioactive substances into the environment while working on HTRW work sites. An additional major problem with these land reclamation activities is personnel safety. The instant invention solves these problems.

In particular, the invention herein provides a reclamation apparatus and method for accomplishing safe and secure secondary containment of waste storage structures that include single-shell tanks for either closure or corrective action work plans and tertiary containment for double-shell tank corrective actions. This invention can also be applied to burial vaults, trenches, discharge cribs, or overflow drains as well.

Prior inventions that address secondary containment methods and systems of single shell tanks and waste fields per se are U.S. Pat. Nos. 4,552,166 and 4,618,284 respectively. Neither of these references teach of a means to prevent HTRW emissions into the environment while corrective secondary containment measures are ongoing. Indeed, the instant invention is a means for overcoming such problems which is taught by the inventor's article entitled "Movable Air Form Structures for Containing Airborne Releases," published in *Concrete International*, August 1993 edition, pp. 30-35.

SUMMARY OF THE INVENTION

The present invention provides a means for secondary containment of airborne releases from underground storage tanks, trenches, cribs, and vaults. Airborne releases of nuclear waste from previously operated nuclear weapons plants is a particular situation that this invention can be applied to. The dome structures discussed herein are fabricated by use of a large inflatable fabric form (IFF) which is a membrane that is insulated and hardened by specialized shotcrete processes whose preferred form is either spherical or elliptical. The dome structures discussed herein are reusable by making them transportable. Mobility is provided by a single crane or by large capacity crawler transporters. Both of these preferred means links-up to the dome structure by lifting and carrying the dome structure to a desired HTRW location. The dome structure is made of layered materials comprising the thin IFF membrane, an inner urethane foam layer followed by conventional rigidifying shotcrete place on steel reinforcing bars. Other thin shell concrete materials may be used such as latex-modified, glass fiber-reinforced mortar and a specialized shotcrete known as spray-up. Advanced materials that can be used include composite materials in place of shotcrete. Other novel features include a post-tensioned reinforced concrete ring beam which serves as a footing that includes steel-insert reinforced blockout lifting points for load transfer to the crawler transporters. In addition to the basic dome structure, utilities for the work site may be required that include an airlock unit for segregated access into the dome structure interior as well as other portable trailer utilities for heating, ventilating, air conditioning and decontamination of the dome structure.

OBJECTS OF THE INVENTION

Accordingly, several objects and advantages of the present invention are:
(a) To provide a reusable land reclamation apparatus and method for achieving secondary containment for single-shell tanks closure or corrective actions and tertiary containment for double-shell tanks corrective actions without HTRW emissions into the environment.
(b) To provide a reusable IFF monolithic composite dome structure that includes a means for mobility thereof that is cost effective for sampling, containing or retrieving HTRW while complying with the Department of Energy's general structure design criteria pursuant to DOE order 6430.1A.
(c) To provide a structural means of assuring worker safety at HTRW work sites.
(d) To provide a novel and versatile footing structure for IFF monolithic dome structures that allows for transport thereof.

Still further advantages will become apparent from a consideration of the ensuing detailed description and drawings.

BRIEF DESCRIPTION OF THE DRAWINGS

FIG. 3b shows a cross-sectional view a—a of a segmented post-tensioned concrete ring beam as shown in FIG. 3a.

DETAILED DESCRIPTION

The concept of creating an all-weather dome structure that withstands any climatic conditions in most parts of the world is very useful for most HTRW land reclamation operations. The IFF monolithic dome construction technology has been perfected to the point where a wide range of durable and readily constructible structures are possible. The IFF dome structural shapes have included hemispheres, ellipsoids or cylinders. Applications have included homes, factories or storage facilities. South et al.'s U.S. Pat. No. 4,155,967 and Dykmans' U.S. Pat. No. 5,094,044, which are hereby incorporated by reference, teach of the IFF monolithic dome construction technology which use the IFF membrane that is reinforced by steel reinforcing bars and rigidified with materials such as shotcrete or advanced light weight composite materials.

Figure 1:
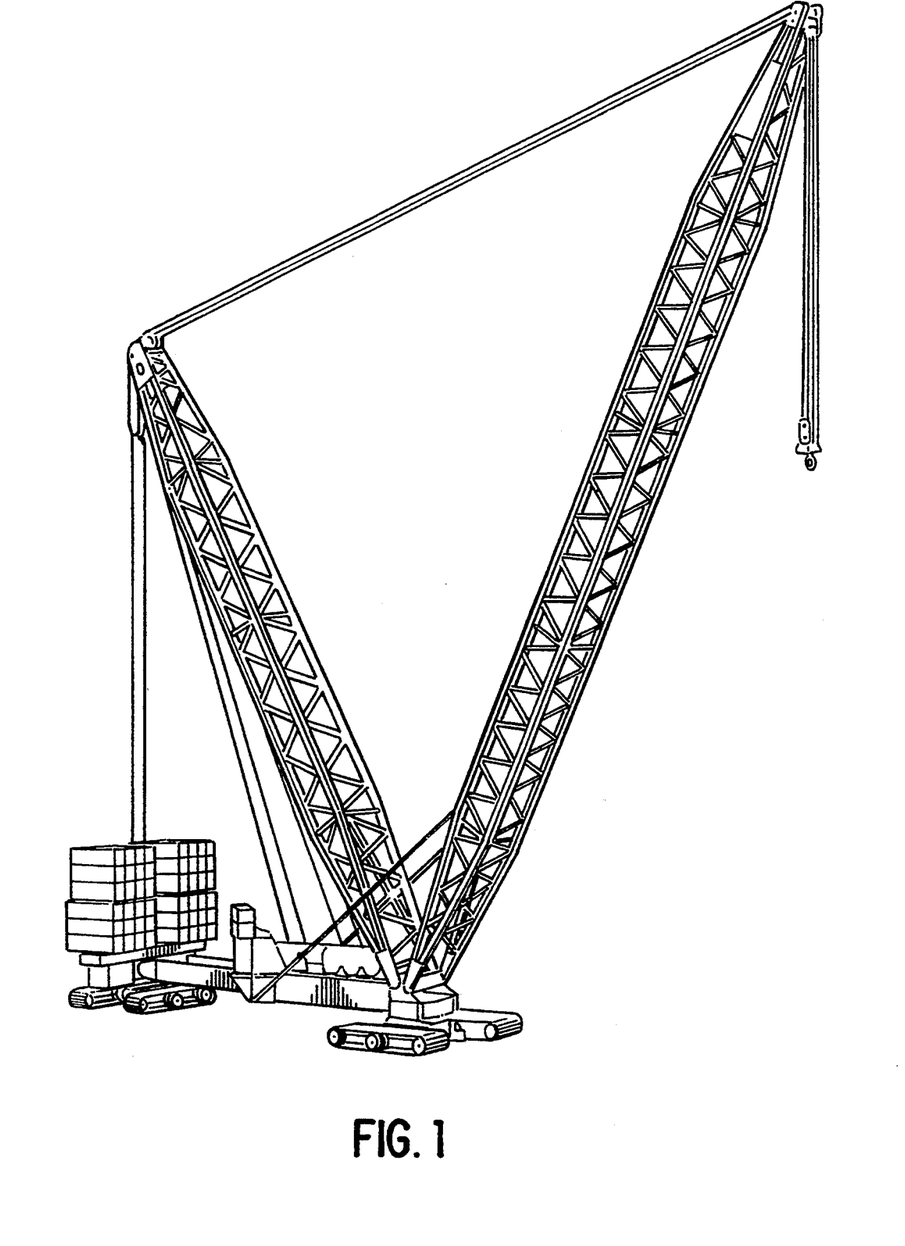
FIG. 1 shows a perspective view of a typical crane that can lift and carry the IFF monolithic dome structure.

For mobility of the dome structure (10) which is of sufficient size to perform the land reclamation activities, the movable crane as shown in FIG. 1 can meet the lift and transport requirements for movement of the dome structure to a HTRW work site. In particular, Lampson Inc. "Transi-Lift," registered trademark, crane can perform these functions. Table 1 provided herein provides details as to the boom length, mast length, load radius and capacities.

TABLE 1

| Lampson "Transi-Lift" Physical Characteristics | | | |
|---|---|---|---|
| Boom Length Feet | Mast Length Feet | Load Radius Feet | Capacities - Kips Main Boom |
| | | | 120 Ft. Stinger |
| 280 | 220 | 50 | 3994 |
| | | 100 | 3729 |
| | | 150 | 2618 |
| | | 200 | 1886 |
| | | 250 | 1271 |
| | | 280 | 794 |
| 340 | 220 | 62 | 3072 |
| | | 100 | 2865 |
| | | 150 | 2579 |
| | | 200 | 2149 |
| | | 300 | 1237 |
| | | 340 | 657 |
| 400 | 220 | 72 | 2604 |
| | | 100 | 2470 |
| | | 150 | 2149 |
| | | 200 | 1724 |
| | | 250 | 1328 |
| | | 300 | 970 |
| | | 350 | 646 |
| | | 400 | 247 |
| 490 | 220 | 88 | 1827 |
| | | 100 | 1774 |
| | | 150 | 1564 |
| | | 200 | 1320 |
| | | 250 | 1057 |
| | | 300 | 785 |
| | | 350 | 571 |

TABLE 1-continued

| Lampson "Transi-Lift" Physical Characteristics | | | |
|---|---|---|---|
| Boom Length Feet | Mast Length Feet | Load Radius Feet | Capacities - Kips Main Boom |
| | | 400 | 359 |
| | | 450 | 139 |

Figure 2A:
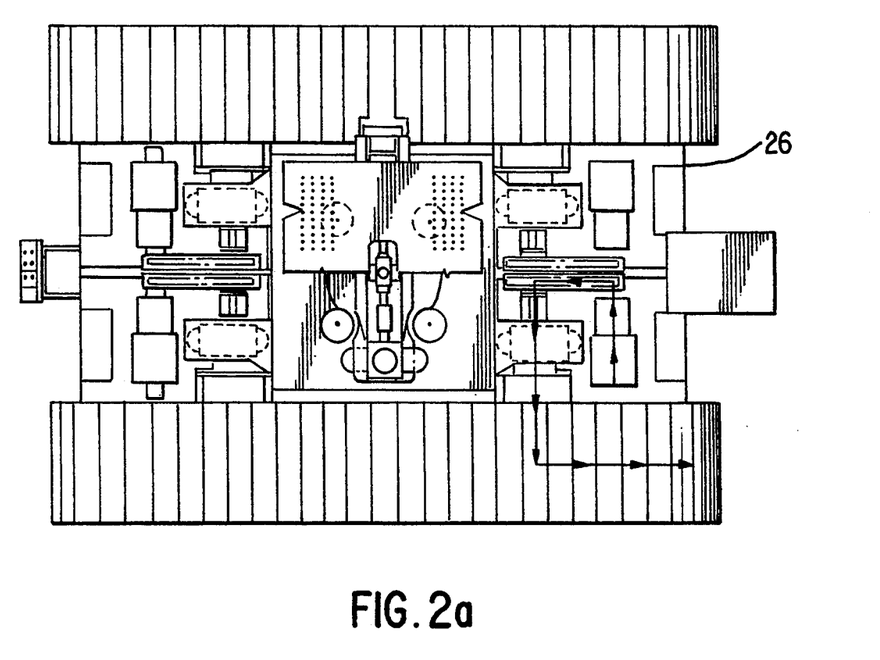
FIG. 2a and 2b shows a top view and side view respectively of a crawler transporter showing a power unit location and bolster unit mounted thereto for lifting and carrying the IFF monolithic dome structure. Flow of power from the engine to track is indicated by dotted lines and arrows.
Figure 2B:
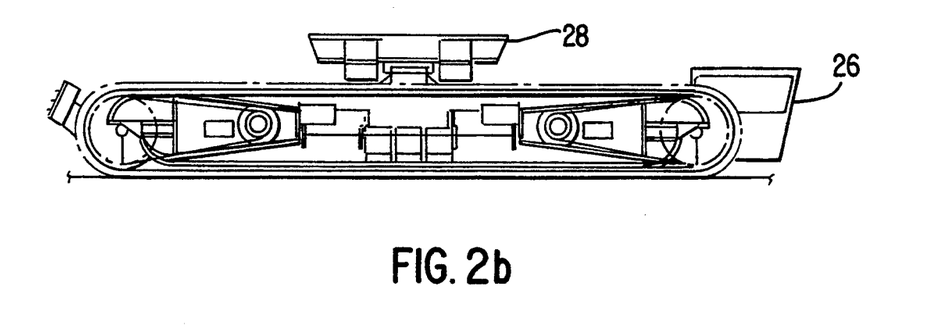

Another mechanical ways to provide mobility for the dome structure (10) for retrieval operations from single-shell tank's (SST), double-shell tanks or trenches is a crawler transporter. A typical crawler transporter (26) as shown in FIG. 2a and 2b is made by Lampson, Inc. as well. This type of crawler transporter is available in several sizes, e.g. 600, 800, 1000, 1200, 2000, 3000, and 4000 ton units. The following table gives some pertinent data for this invention:

TABLE 2

| Crawler/Transporter Specification | | |
|---|---|---|
| | Unit size | |
| Parameters | 1200 ton | 2000 ton |
| Length overall | 34 ft | 39 ft |
| Width | 26 ft | 29 ft |
| Minimum height w/bolster | 85 in. | 86 in. |
| Maximum height w/bolster | 101 in. | 104 in. |
| Depth of car body | 3 ft | 3 ft |
| Length of track pad | 6 ft | 7 ft |
| Weight of track pad | 850 lb | 1350 lb |
| No. of track rollers | 48 | 56 |
| No. of power units | 2 | 4 |
| Bolster capacity | 1200 ton | 2000 ton |
| Bolster hydraulic pressure | 5000 psi | 5000 psi |
| Weight of crawler less bolster | 180 ton | 300 ton |
| Weight of bolster | 20 ton | 30 ton |
| Horsepower | 800 gross | 1400 gross |
| Theoretical drawbar pull | $1.8 \times 10^6$ lb | $2.1 \times 10^6$ lb |
| Speed: No load | 2.2 mph | 3.2 mph |
| 1000 ton load | 1.3 mph | 2.8 mph |
| 2000 ton load | — | 1.6 mph |
| Footprint | 336 ft$^2$ | 446 ft$^2$ |
| Ground pressure w/max. load | 57.8 psi | 9.4 psi |
| Minimum ground clearance | 13 in. | 13 in. |

The next important feature of the invention is a bolster unit for the crawler transporter (26), i.e. the jacking load lifting system for the dome structure (10). For the designs provided herein, a Lampson crawler transporter (LCT) 1200 and 2000 ton units are used as examples. The bolster hydraulic pressure of each jacking system is 5,000 psi. These bolster units (28) would typically weigh 20 tons for the 1200 ton LCT and 30 tons for the 2000 ton unit. The draw-bar pull for each of these massive LCT's is 1.8 million pounds for the smaller crawlers and 2.1 million pounds for the larger version. Table 2 provides other parameters such as lift height of 18 inches and a minimum ground clearance of 13 inches. Each LCT with bolster unit (28) are typically powered with four diesel engines. The ground pressure with maximum load is approximately 57.8 psi and 9.5 psi for the 1200 and 2000 on LCT units respectively. Each LCT with bolster unit provides for the following load support: vertical motion of 18 inches; three-point suspension; and rotational freedom. Typically, three of the larger LCTs with bolster units can lift and carry a 6000 ton load.

Figure 3A:
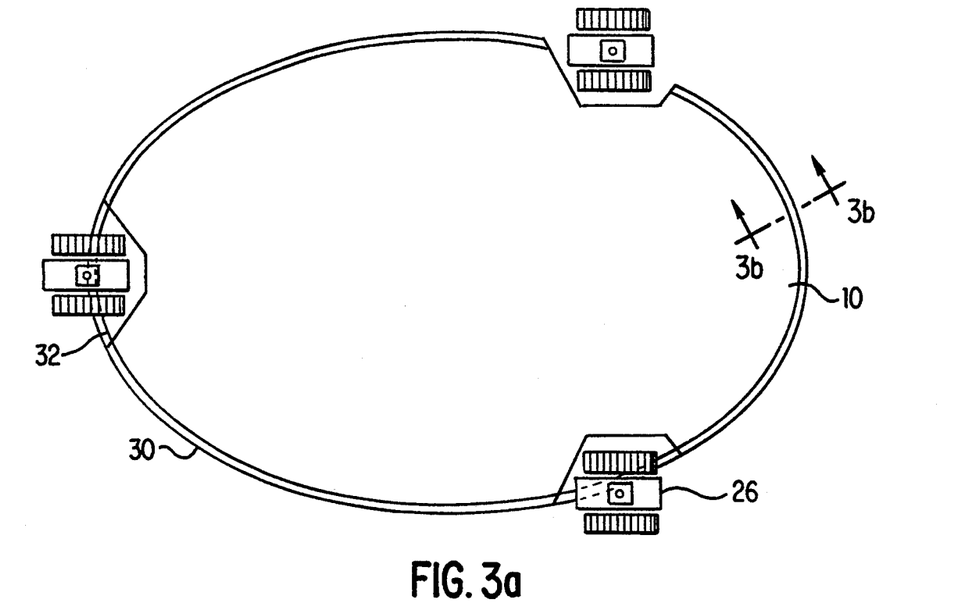
FIG. 3a shows a top view of the post-tensioned, concrete, segmented ring beam foundation for the dome structure with means for transporting by at least three crawler transporters.

The mobile air form dome structure (10) depends on creating a ring beam (30) that is used as a tie-down for the dome structure's IFF (12) and also provide a foundation for the dome structure (10). The ring beam (30) requires at least three lifting point blockout frames (32)

positioned at the circumference of the dome structure as shown in FIG. 3a. These blockout frames form discontinuities in the ring beam, thus the ring beam (30) is a segmented and post-tensioned reinforced concrete curved steel.

Figure 3B:
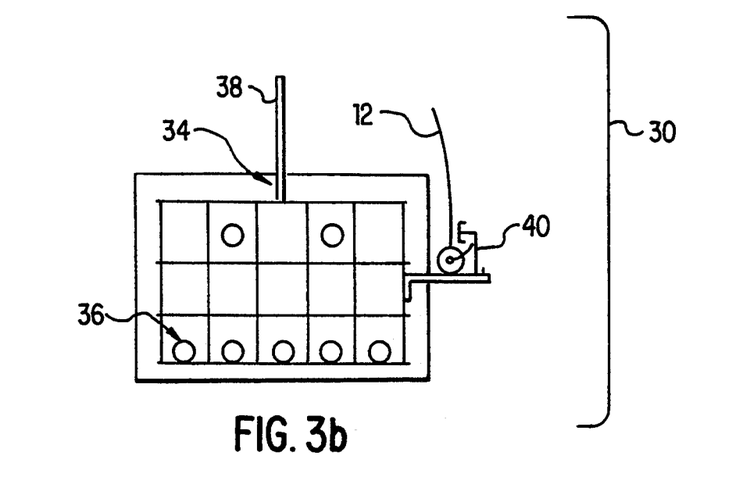

The cross-section of the ring-beam as shown in FIG. 3b is a conventional steel-reinforced concrete beam (34) with post-tensioning ducts which would receive post-tensioned cables for final post-tensionsing (36). This ring beam footing is used for the application of urethane foam layer that is applied to the IFF (12). The ring beam (30) also includes a foundation dowel inserts (38) for the dowel connection to the stub wall.

Next operation in construction of the dome structure (10) after the ring beam (30) is in place is the spreading the IFF (12) over the dome area and securing the perimeter thereof with channel tie-downs (40) to the foundation ring beam (30). The IFF (12) includes a perimeter skirt that can receive a granular backfill to form an air-tight seal prior to pressurizing the IFF with diesel blowers. After the IFF (12) is inflated, approximately 3-inch thickness of urethane foam is added to the interior surface of the IFF (12). The urethane foam layer (18) is sprayed from the bottom at the ring beam (30) to the top in a circular lift pattern. Such well known techniques of making the dome structure is discussed in South et al.'s U.S. Pat. No. 4,155,967 and Dykmans' U.S. Pat. No. 5,094,044. The urethane foam layer provides several functions: a temporary support for the IFF; a surface to tie the steel reinforcing bars; allows for optimal use of the dome mass and acts as a thermal insulation barrier for maintaining environmental control within the dome structure which allows non-stop work at HTRW work sites regardless of weather conditions.

Figure 4A:
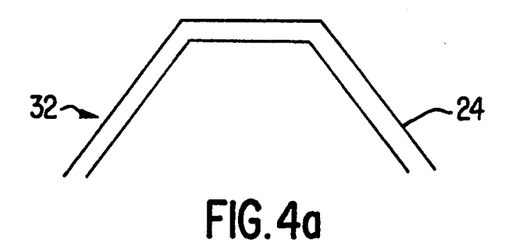
FIG. 4a, 4b and 4c shows a lifting point blockout frame assembly for transfer of load from the ring beam foundation to the means for transporting.
Figure 4B:
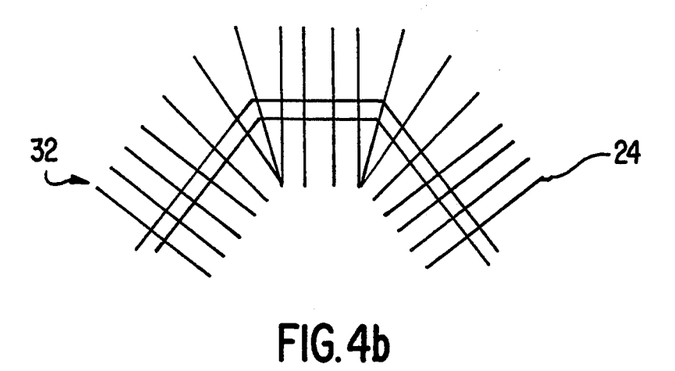
Figure 4C:
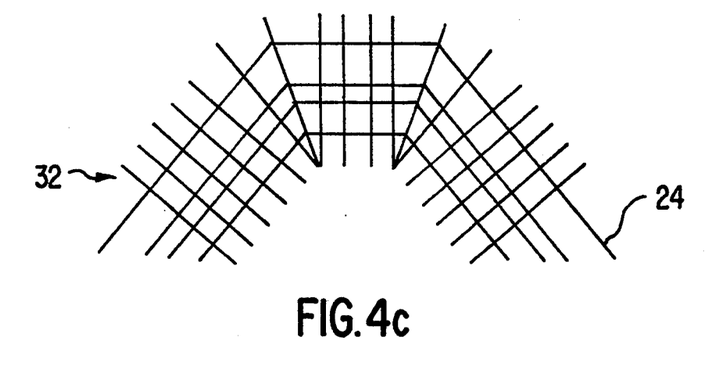

Once the urethane foam layer (18) is in place, the dome structure (10) has sufficient strength to maintain the desired shape without pressurization. The lifting point blockouts (32) form voids in the insulation layer at this time, and the exterior of the IFF (12) may be cut and fitted for installing the lifting point blockout frames (32). The lifting point frame and load transfer concept is accomplished by using reinforcing steel throughout the blockout frames (32) as shown in FIG. 4a, 4b, and 4c respectively. Once the lifting point frames are installed, the lifting point assembly (44) is assembled which includes the blockout frames (32) and internal truss cross-tie structure (42). The lifting point assembly (44) has three major functions: to transfer load of the structure to the crawler transporters or crane; to provide continuity for the post-tensioned ring beam footing; and to provide internal truss cross-tie assembly that may be needed for the traveling mode of the dome structure.

Figure 5A:
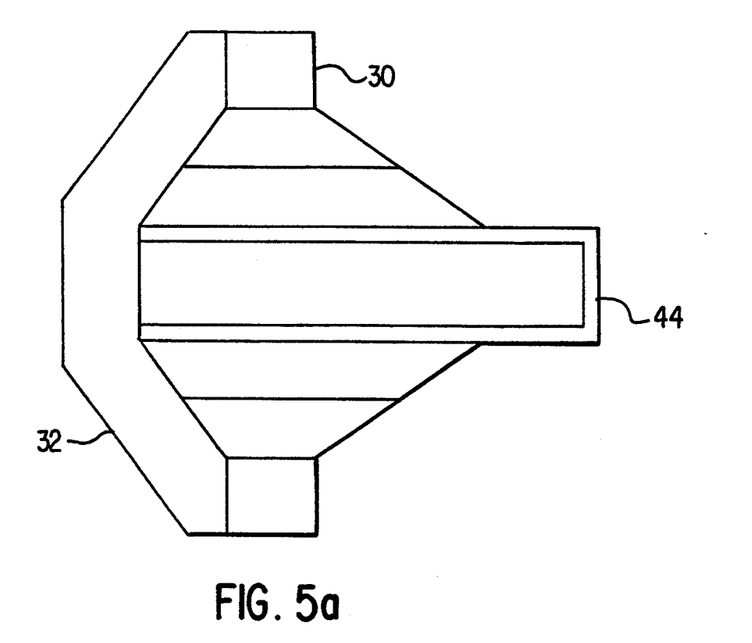
FIG. 5a and 5b shows a plan and elevation view of the lifting point assembly and internal truss cross-tie respectively.
Figure 5B:
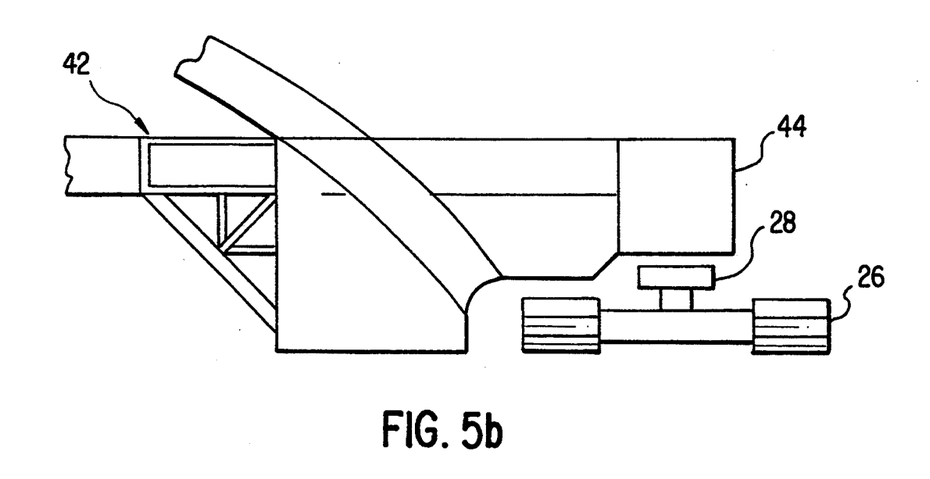

The lifting point assembly (44) is depicted in FIG. 5a in a top view and 5b in an elevation view. The lifting point assembly (44) includes an internal truss cross-tie structure (42) to insure a static stable structure that allows for transport of the completed ring beam (30) with dome structure. At least three blockout frames (32) are required in the ring beam (30) for transport of the dome structure (10) using the crawler transporters (26).

Figure 6A:
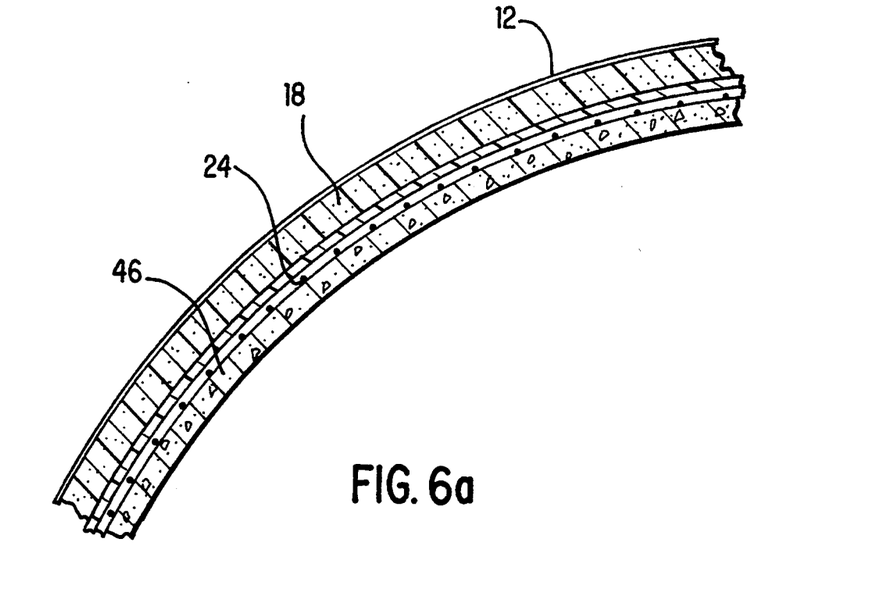
FIG. 6a shows a cross-sectional sidewall view of a conventional IFF monolithic dome construction.
Figure 6B:
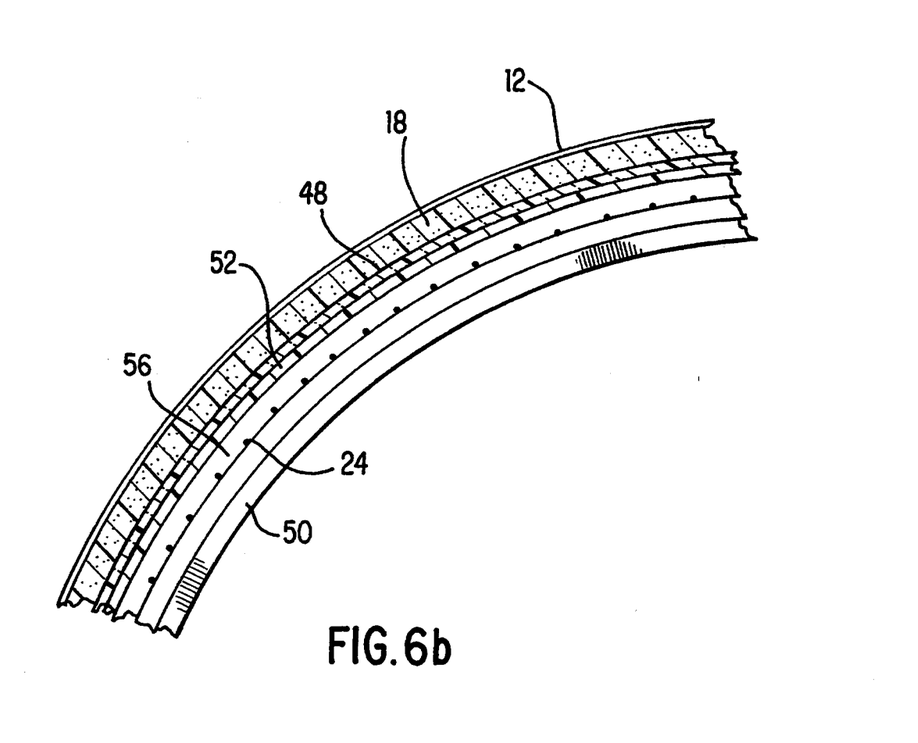
FIG. 6b shows a cross-sectional sidewall view of a modified layered IFF monolithic dome construction.

The dome structure (10) can be fabricated by either a conventional monolithic dome construction as depicted in FIG. 6a or a layered dome construction for a larger enclosures as shown in FIG. 6b. For either of these dome constructions, the South et al. U.S. Pat. No. 4,155,967 and the Dykmans' U.S. Pat. No. 5,094,044 provides methods for their construction. In the instant invention, the shotcrete operation will depend on the size of the dome structure (10) selected.

For conventional monolithic dome construction as shown in FIG. 6a, i.e. in small enclosures of less than 120 feet in diameter or having an elliptical base of up to 100×150 feet in size, the IFF (12) is the outer layer, followed next by a 3-4 inch urethane foam layer (18), then followed by conventional steel reinforcing bars (24) for supporting the dome's shotcrete (46) enclosure. The steel reinforcing bars (24) are mesh form construction for strength. The rigidifying material can be shotcrete (46) which varies in thickness; e.g. at the footing at the ring beam (30), the shotcrete would be approximately 12 inches thick and would taper to a thickness of 2 inches at the dome structure's crown. As an example, for a dome structure that is 117 feet in diameter and 58 feet in height, approximately 700 cubic yards of concrete is required and the weight of the dome structure is 1400 tons. The urethane foam layer (18) also provides a good thermal insulation barrier which in turn enhances environmental control within the dome structure.

The shotcrete (46) would be applied directly on the urethane foam layer (18) after the steel reinforcing bars (24) are tied. The shotcrete layer (46) would be in a similar manner as the urethane foam layer (18), i.e. from the bottom, around the circumference, and up the sidewalls.

FIG. 6b shows a sidewall view of another layered dome construction used in dome structure's whose gross weight exceeds 2000 tons. This construction as depicted includes an IFF (12) outer form; next a urethane foam layer (18) that is 3-4 inches in thickness; followed by a latex modified glass fiber-reinforced mortar (48), (this layer is ⅜-½ inches in thickness and exhibits very hard and durable qualities which facilitates wash down of the dome structure after contamination); followed by an elastomeric bond breaker (52) at the truss ribs (50) which may have post-tensioned conduits and cable assemblies . Finally, the reinforced shotcrete beams (56) for dome enclosure is formed over the steel reinforcing bars (24) for rigidifying the dome structure.

BEST MODE OF OPERATION

Figure 7:
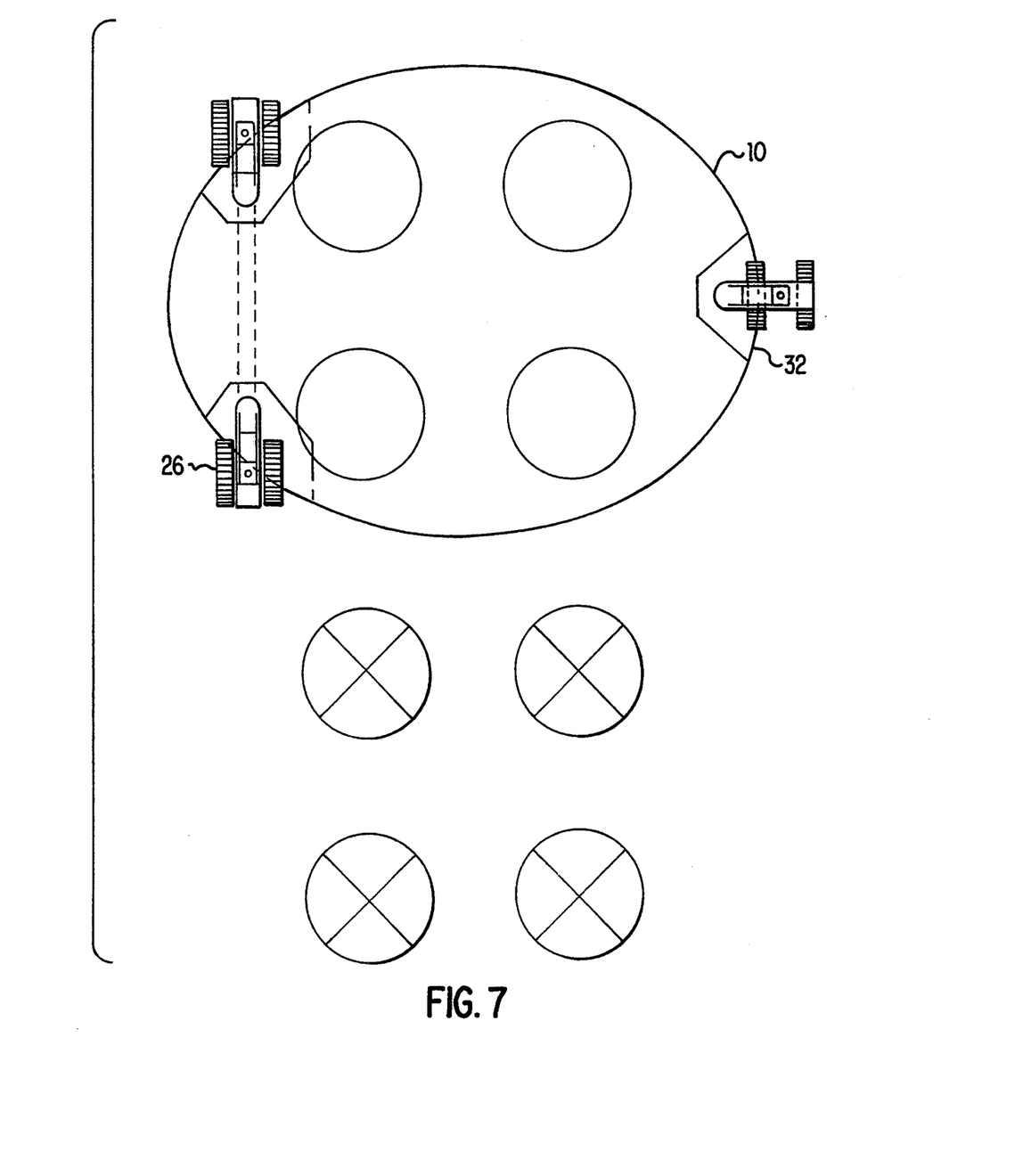
FIG. 7 shows the method at an HTRW work site of a land reclamation operation of retrieval at a single shell tank farm.

The primary uses of the transportable dome structure are land reclamation activities such as sapling hazardous wastes from SST's and/or containment and retrieval of such hazardous This concept will drastically reduce the chances of any accidental airborne release of hazardous materials into the environment. The dome structure (10) can be constructed at a remote site prior to transport or near the HTRW site, the crawler transporters would transport in either case. As shown in FIG. 3a, the crawler transporters (26) travel in unison and position the dome structure (10) over the .desired underground SST. FIG. 7 depicts how the dome structure would traverse a tank farm with X designating reclamation activities completed. A the retrieval process is completed, the empty SST's can be decommissioned and be either filled with clean backfill after decontamination or be subject to an in situ vitrification process.

Figure 8:
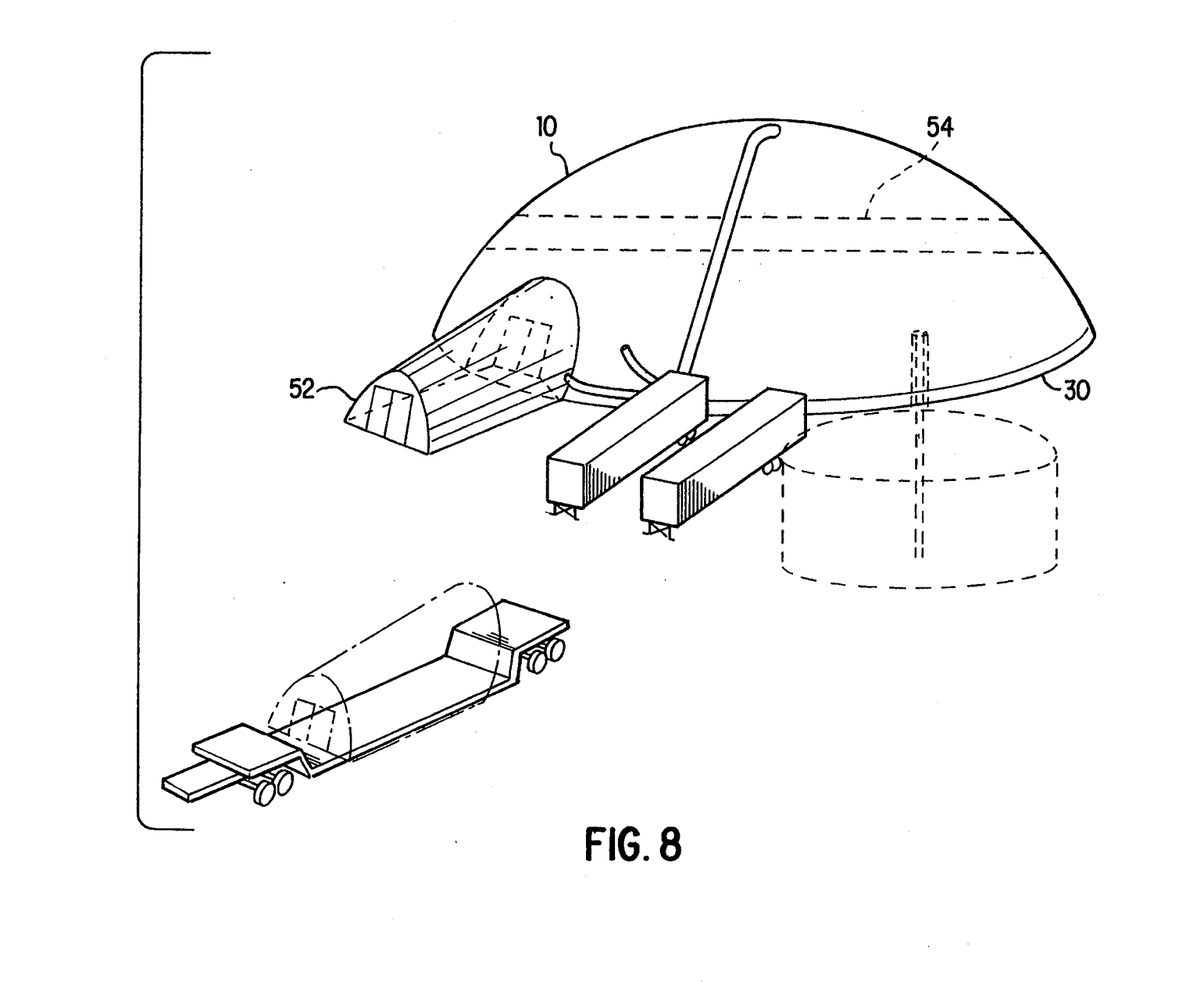
FIG. 8 shows a single shell tank sampling and retrieval operation with hotel utilities.

Additionally, this concept can include utilities of heating, air conditioning, ventilation and airlock units of sufficient size for equipment access. FIG. 8 shows these utilities operate in combination with the dome structure (10) at a HTRW work site with an underground SST. The air lock structure (52) can be handled by mobile cranes and be transported by a low boy trailer as shown. Additionally, the dome structure may include a crane and robotic truss structure (54) within the dome. In summary, this concept allows for the necessary enclosed work area for SST excavating, retrieval and containment of hazardous wastes, and controlled transport of these wastes to applicable treatment facilities without hazardous waste escaping into the environment.

The invention can be used in a typical burial trench when a retrieval operation where a controlled environment is required. Such operations include an initial excavation of hazardous wastes and removal of containerized wastes through an equipment airlock and trench backfilling. Additionally, there would be a belt conveyor and spreading system that can transport the materials to backfill behind the retrieval operations. The geotechnical technologies for a vertical barrier construction may be performed within the dome structure.

Alternate methods for constructing this invention include ways to decrease total weight of the dome structure to allow larger sized structures. For example, weight reduction design may include a lighter layered material in the upper section and crown section of the dome structure by using modern light weight materials such as composite materials or a double walled IFF that incorporates a fabric truss within the fabric walls wherein the structural strength of this type of construction comes from the encasement of the fabric trusses with urethane foam.

The urethane foam may be injected from the interior of the dome enclosure. The pie-shaped roof sections can have sufficient injection ports to ensure proper port filling. All lifting point blockout frames, load transfer assemblies, and lifting point assemblies can be connected to the ring beam and be reinforced concrete beam construction.

Alternate means for transporting the dome structure includes use of a helicopter sky crane that can transport smaller domes to a HTRW work site.

Although the description above contains many specificities, these should not be construed as limiting the scope of this invention but as merely providing illustrations of some of the presently preferred embodiments of this invention.

I claim:

1. A transportable and reusable dome apparatus for working on hazardous waste materials that provides for worker safety and prevents escape of the hazardous waste into the environment comprising:

(a) a dome structure with a ring beam structure that provides mechanical means for transporting the dome structure whereby the dome structure can be moved to a location that encompasses the hazardous waste work site whereby the ring beam structure comprises a reinforced, segmented, concrete ring beam; and (b) a mechanical means for transporting the dome structure: and (c) utilities for the dome structure whereby working and environmental conditions can be controlled and maintained within the dome structure at the hazardous waste work site.

2. The apparatus of claim 1 wherein the dome structure is an inflatable fabric form monolithic dome construction.

3. The apparatus of claim 2 wherein the ring beam is an arcuate, segmented reinforced concrete beam that is post-tensioned whereby the ring beam provides a foundation and footing for the dome structure with a tiedown, having a bolted connection, for securing an inflatable fabric form; and the segmented ring beam has at least three blockout support structures that accept lifting points in the perimeter of the ring beam whereby the lifting points provide a link-up with the mechanical means for lifting and transporting the dome structure.

4. The apparatus of claim 3 wherein the ring beam further includes an internal truss cross-tie structure whereby stability and rigidity is imparted to the dome structure for reliable transport.

5. The apparatus of claim 1 wherein the mechanical means for transporting is a crawler transporter with a bolster unit.

6. The apparatus of claim 1 wherein the mechanical means for transporting is a crane unit.

7. The apparatus of claim 1 wherein the utilities include an air lockout, air conditioning, an air decontamination unit external to the dome structure and a means for supporting a robotic crane internal to the dome structure.

8. In a monolithic dome structure formed by an inflatable fabric form construction process that includes:

a ring beam foundation which provides: i) a footing for the dome structure; and ii) a tie down for an inflatable fabric form air form;

a means for reinforcing the inflatable fabric form; and a means for applying a rigidifying material to the inflatable fabric form, the improvement comprising:

the ring beam foundation that includes:

a reinforced, segmented, concrete, ring beam with a means for post-tensioning; and at least three blockout support structures located in the perimeter of the ring beam with lifting points that provide a link-up for a mechanical means for lifting and transporting the dome structure.

* * * * *